March 3, 1942.   G. McCORMICK   2,274,928
TIRE RETAINING CLIP FOR RAILWAY WHEELS
Filed Dec. 13, 1941
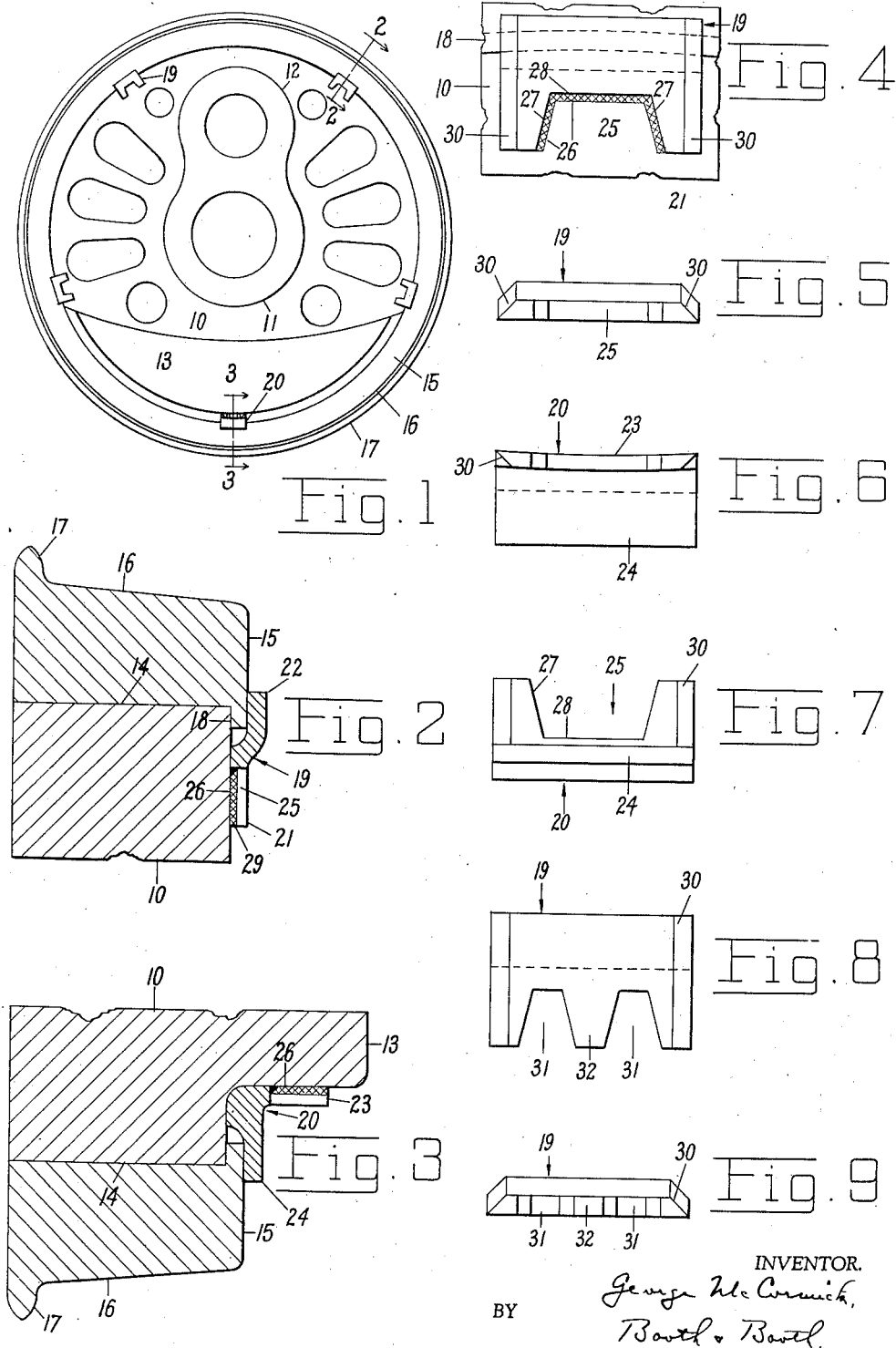
INVENTOR.
George McCormick,
BY Booth & Booth,
Attorneys.

Patented Mar. 3, 1942

2,274,928

UNITED STATES PATENT OFFICE 2,274,928

TIRE RETAINING CLIP FOR RAILWAY WHEELS

George McCormick, Redwood City, Calif.

Application December 13, 1941, Serial No. 422,903

7 Claims. (Cl. 295—15)

The present invention relates to metal tired railway wheels, and constitutes an improvement upon the device forming the subject matter of United States Letters Patent No. 1,773,740 issued to me August 26, 1930.

The general objects of the present invention are the same as those stated in my said prior patent, viz: to prevent dislocation of the tire in the event that it becomes loose on the wheel center, and to accomplish this result by means which leave the annular joint between wheel center and tire exposed to view for inspection.

The present invention is similar in general form and arrangement to the device described in my said prior patent, in that it contemplates an inwardly projecting annular flange on the inner periphery of the tire which engages one side face of the wheel center, and a plurality of clips spaced around the periphery of the wheel center, each of said clips having one end portion welded to the wheel center and the other end overlapping and bearing against the face of the tire. The flange prevents shifting of the tire axially in one direction and the clips prevent shifting in the opposite direction, so that the tire is securely held against axial or endwise dislocation even if it becomes loose on the wheel center.

The specific improvement of the present invention resides in the shape and form of the clip, whereby it is more strongly attached to the wheel center by welding. In the use of the device described in my said prior patent, it has been found that in welding the clips to the wheel centers, mechanics sometimes permit the welding flame to impinge upon the inner edge of the tire, thereby affecting adversely the molecular structure of the steel of the tire and causing ultimate failure thereof. In order to prevent such harmful effects, I now provide the novel form of clip herein described and illustrated.

My invention has its greatest use on the driving and trailing wheels of railway locomotives, although it may be used upon other metal tired wheels, and it is to be understood that changes, within the scope of the claims hereto appended, may be made in the form, construction and arrangement of the device as herein shown and described, without departing from the spirit of the invention.

In the accompanying drawing, Fig. 1 is a side elevation of a driving wheel embodying one form of my invention.

Fig. 2 is a section through the tire and the outer portion of the wheel center, taken on the radial line 2—2 of Fig. 1, one of my improved clips being shown in section.

Fig. 3 is a section similar to Fig. 2 but taken on the radial line 3—3 of Fig. 1 through the counterbalance weight, showing my improved clips as formed for use in this position.

Figs. 4 and 5 are respectively a side elevation and an inner end or bottom elevation of the clip shown in Fig. 2.

Figs. 6 and 7 are respectively a side elevation and an outer end or bottom elevation of the clip shown in Fig. 3.

Figs. 8 and 9 are respectively a side elevation and an innner end elevation of a slightly modified form of clip adapted for use in the same position on the wheel as the clip shown in Fig. 2.

Referring in more detail to the drawing, the reference numeral 10 designates the center portion of a locomotive driving wheel, having a hub 11, a boss 12 for the crank pin, and a counterbalance weight 13. The outer periphery 14 of the wheel center is preferably a cylindrical surface, upon which the steel tire 15 is shrunk. The tire has the usual tread 16 and gauge or rail-running flange 17 on its outer periphery. An annular flange 18 extends inwardly from the inner periphery of the tire at the side opposite the gauge flange 17, and engages the side face of the wheel center. A plurality of clips 19 and 20 are spaced around the wheel as may be required, the clips 19 having their inner ends 21 welded to the side face of the wheel center, the outer ends 22 of said clips being offset outwardly to bear against the side face of the tire. The clips 20 that are positioned along the edge of the counterbalance weight 13 have the form shown in Fig. 3, with a horizontal portion 23 welded to the outer edge of the counterbalance weight and a vertical offset portion 24 bearing against the side face of the tire. Thus the flange 18 prevents shifting of the tire upon the wheel center inwardly toward the center of the track, and the clips 19 and 20 prevent said tire from shifting outwardly. So much is substantially similar to the disclosure of my prior patent hereinbefore mentioned.

In my said prior disclosure it was contemplated, and it was so shown in the drawing of the patent, that the clips would be welded to the wheel center only along their extreme inner ends, at the point most remote from the tire. In practice, however, it has been found necessary, in order to provide the clip with sufficient strength and holding power, to run the weld up along the sides of the clip toward the tire, and in so doing it is extremely difficult to avoid overheating the tire at restricted regions beneath the clips. This unintended and intense overheating in restricted areas has caused localized molecular changes in the metal of the tire, and has resulted in defects which in some cases have progressed to such an extent as ultimately to cause failure.

My present improvements are designed to make it unnecessary for the weld to approach the tire so closely as to cause overheating thereof, and to this end my improved clip is formed in a manner now to be described.

The inner end 21 of the clip 19 is provided with a recess 25, Figs. 2 and 4, and the weld 26 is made only along the boundary line of said recess. The depth and width of the recess 25 are such that the weld, when made along said boundary line, will have sufficient strength to hold the clip against the maximum side thrust that may be exerted against its outer end by a loose tire. Thus the side edges 27 of the recess provide space for two welds extending lengthwise of the clip for a considerable distance from its inner end, and the base 28 of said recess provides space for a line of welding extending transversely of the clip at a point considerably remote from its inner end. Considering the clip, as seen in Fig. 2, as a lever with its fulcrum at the point 29 and with the force of the tire exerted against the upper end 22 of the clip in a direction toward the right, it will be obvious that the longitudinal welds along the sides of the recess and the transverse weld along the base of said recess, all of which are between the fulcrum and the point of application of force, will be very much stronger than a single weld along the bottom edge at the fulcrum point 29, and will give the clip much greater holding power.

The depth of the recess 25 is such that its base 28 is sufficiently remote from the tire flange 18 to prevent possible overheating of any portion of the tire during the formation of the weld. The welding mechanic is to be instructed to weld only within the recess, along the bounding edges thereof. Consequently, if he makes his weld as directed, he will be in no danger of overheating the tire. As a further precaution against possible overheating of the tire, the side edges 30 of the clip are beveled to a thin or feather edge, as shown in Figs. 4 and 5, whereas the edges 27 and 28 of the recess are square or perpendicular to the face of the wheel. Beveled edges are not suitable to the type of welding here employed, so that an experienced mechanic, even in the absence of specific instructions, will confine his weld to the square edges of the recess, and will not make the mistake of welding the outside edges of the clip with the attendant danger of carrying the weld too close to the tire and overheating the same.

The angle clips 20, Figs. 3, 6 and 7, used at points on the wheel where the counterbalance weight 13 approaches close to the outer periphery of the wheel center, are formed in a manner similar to that described above. The horizontal portion 23 of the clip 20 is provided with the recess 25, whose side and base edges 27 and 28 are welded, as shown at 26, to the horizontal shoulder of the counterbalance weight 13, which is to all intents and purposes a part of the wheel center. The side edges of the clip 20 are beveled, as shown at 30.

As a slight modification of the above described form of clip, I may provide two or more recesses 31, Figs. 8 and 9, separated by one or more tongues 32, in place of the single recess 25 of Figs. 4 and 7. This provides a greater aggregate length of weld, and is therefore stronger. Obviously each recess 31 must be wide enough to permit a satisfactory weld to be made within it. As before, the welding is done only within the recesses, along their bounding edges, and the side edges 30 of the clip are beveled to prevent welding at these points.

I claim:

1. In a railway wheel having a metal wheel center and a metal tire surrounding the periphery thereof, said wheel center and said tire having mutually engaging portions to prevent shifting of the tire in one lateral direction, a plurality of clips spaced around the wheel for preventing said tire from shifting in the opposite direction, each of said clips having its outer end portion overlapping the side face of the tire and its inner end portion overlapping the wheel center, said inner end portion having a recess whose depth is less than the distance between the inner end of said clip and the inner edge of the tire, and a welded joint between said clip and the wheel center, said welded joint being confined to the bounding edges of said recess.

2. In a railway wheel having a metal wheel center and a metal tire surrounding the periphery thereof, said wheel center and said tire having mutually engaging portions to prevent shifting of the tire in one lateral direction, a plurality of clips spaced around the wheel for preventing said tire from shifting in the opposite direction, each of said clips having its outer end portion overlapping the side face of the tire and its inner end portion overlapping the wheel center, said inner end portion having a recess all bounding edges of which are spaced from the inner periphery of the tire, and a welded joint between said clip and the wheel center, said welded joint being wholly within the bounding edges of said recess.

3. In a railway wheel having a metal wheel center and a metal tire surrounding the periphery thereof, said wheel center and said tire having mutually engaging portions to prevent shifting of the tire in one lateral direction, a plurality of clips spaced around the wheel for preventing said tire from shifting in the opposite direction, each of said clips having its outer end portion overlapping the side face of the tire and its inner end portion overlapping the wheel center, the side edges of said clip being beveled to make them unsuitable for welding, said clip having a recess formed in its inner end portion between its extreme inner end and the inner periphery of the tire, the bounding edges of said recess being formed suitably for welding to the wheel center, said bounding edges of the recess being spaced from the inner periphery of the tire, and a welded joint along said bounding edges of the recess, said joint fastening the clip to the wheel center.

4. In a railway wheel having a metal wheel center and a metal tire surrounding the periphery thereof, said wheel center and said tire having mutually engaging portions to prevent shifting of the tire in one lateral direction, a plurality of clips spaced around the wheel for preventing said tire from shifting in the opposite direction, each of said clips having its outer end portion overlapping the side face of the tire and its inner end portion overlapping the wheel center, some portions of the bounding edge of said inner end portion being formed to make them unsuitable for welding to the wheel center and other portions of said bounding edges being formed suitably for welding, said suitably formed portions lying between the extreme inner end of the clip and the inner periphery of the tire and being spaced from said tire, and a welded joint between said suitably formed portions of the bounding edges and the wheel center.

5. In a railway wheel having a metal wheel center and a metal tire surrounding the periphery, said wheel center having a counterbalance weight near its periphery and projecting laterally from its side face, said wheel center and said tire having mutually engaging portions to prevent shifting of the tire in one direction, a plurality of clips spaced around the wheel for preventing said tire from shifting in the opposite direction, said clips having their outer end portions overlapping the side face of the tire and their inner end portions overlapping the wheel center, the clips at said counterbalance weight having their inner end portions directed laterally to lie against the peripheral surface of said counterbalance weight, the inner end portions of said clips having recesses whose bounding edges are spaced from the inner periphery of the tire, and welded joints along said bounding edges of the recesses, said welded joints fastening some of the clips to the peripheral surface of the counterbalance weight and the other clips to the side face of the wheel center.

6. A clip adapted to be welded to a metal wheel center to retain a metal tire thereon, comprising an approximately rectangular piece of metal of substantial thickness having a recess in one end, the bounding edges of said recess being approximately perpendicular to the face of the wheel center to make them suitable for welding, and the side edges of the clip being beveled to make them unsuitable for welding.

7. A clip adapted to be welded to a metal wheel center to retain a metal tire thereon, comprising a metal plate of substantial thickness having an outer end portion formed to overlap the side face of the tire and an inner end portion formed to be welded to the wheel center, said inner end portion having a recess the bounding edges of which are spaced from the inner periphery of the tire, and said bounding edges of the recess being perpendicular to the face of the clip to facilitate welding said clip to the wheel center.

GEORGE McCORMICK.